(12) United States Patent
Soulhi et al.

(10) Patent No.: US 11,792,664 B2
(45) Date of Patent: Oct. 17, 2023

(54) VIRTUALIZED ARCHITECTURE FOR SYSTEM PARAMETER IDENTIFICATION AND NETWORK COMPONENT CONFIGURATION WITH REINFORCEMENT LEARNING

(71) Applicant: Verizon Patent and Licensing Inc., Basking Ridge, NJ (US)

(72) Inventors: Said Soulhi, Boston, MA (US); Bryan Christopher Larish, Westfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 318 days.

(21) Appl. No.: 17/349,455

(22) Filed: Jun. 16, 2021

(65) Prior Publication Data
US 2022/0408284 A1 Dec. 22, 2022

(51) Int. Cl.
*H04W 24/06* (2009.01)
*H04W 24/02* (2009.01)
*H04B 17/391* (2015.01)

(52) U.S. Cl.
CPC ........ *H04W 24/06* (2013.01); *H04B 17/3912* (2015.01); *H04W 24/02* (2013.01)

(58) Field of Classification Search
CPC ... H04W 24/06; H04W 24/02; H04B 17/3912
See application file for complete search history.

(56) References Cited

U.S. PATENT DOCUMENTS 11,601,379 B1 * 3/2023 Cai .......................... H04L 43/16
2020/0366557 A1 * 11/2020 Chi ........................ H04W 24/06

* cited by examiner

*Primary Examiner* — Natasha W Cosme

(57) ABSTRACT

One or more computing devices, systems, and/or methods for system parameter identification and network component configuration are provided. A state comprising a system parameter combination, a traffic model, and a channel assignment may be generated. A network traffic scenario is executed through a virtualized testbed using the state. A reward for the system parameter combination may be generated based upon key performance indicators output by the network traffic scenario. A reward policy and rewards generated for system parameter combinations are used to select a system parameter combination that is used to configure a network component of a communication network.

20 Claims, 11 Drawing Sheets

VIRTUALIZED ARCHITECTURE FOR SYSTEM PARAMETER IDENTIFICATION AND NETWORK COMPONENT CONFIGURATION WITH REINFORCEMENT LEARNING

BACKGROUND

A communication network may comprise a variety of network components that enable communication devices, such as user equipment, to communicate over the communication network. For example, the communication network may comprise base stations (e.g., a gNodeB base station, an eNodeB base station, etc.), baseband units, core network components, antennas, repeaters, switches, radio access network (RAN) controllers, etc. Many of these network components may be configured with system parameters. For example, radio system parameters may correspond to a time a communication device can be active before being released, a handover failure timer, an interval between subsequent transmissions of radio resource control (RRC) connection requests, etc. Cell system parameters may correspond to a number of channel quality indicator (CQI) resources available on a physical UI control channel, a nominal component of a communication device transmit power, etc. Other system parameters may correspond to a number of attempts for a handover to a cell better than a serving cell before the handover is attempted to a next best cell, limits on communication device transmission power in a serving cell, etc. Each of these system parameters may have numerous values that can be set for the system parameters leading to a combinatorial explosion problem where the number of possible behaviors of the system increases exponentially with the number of these system parameters.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
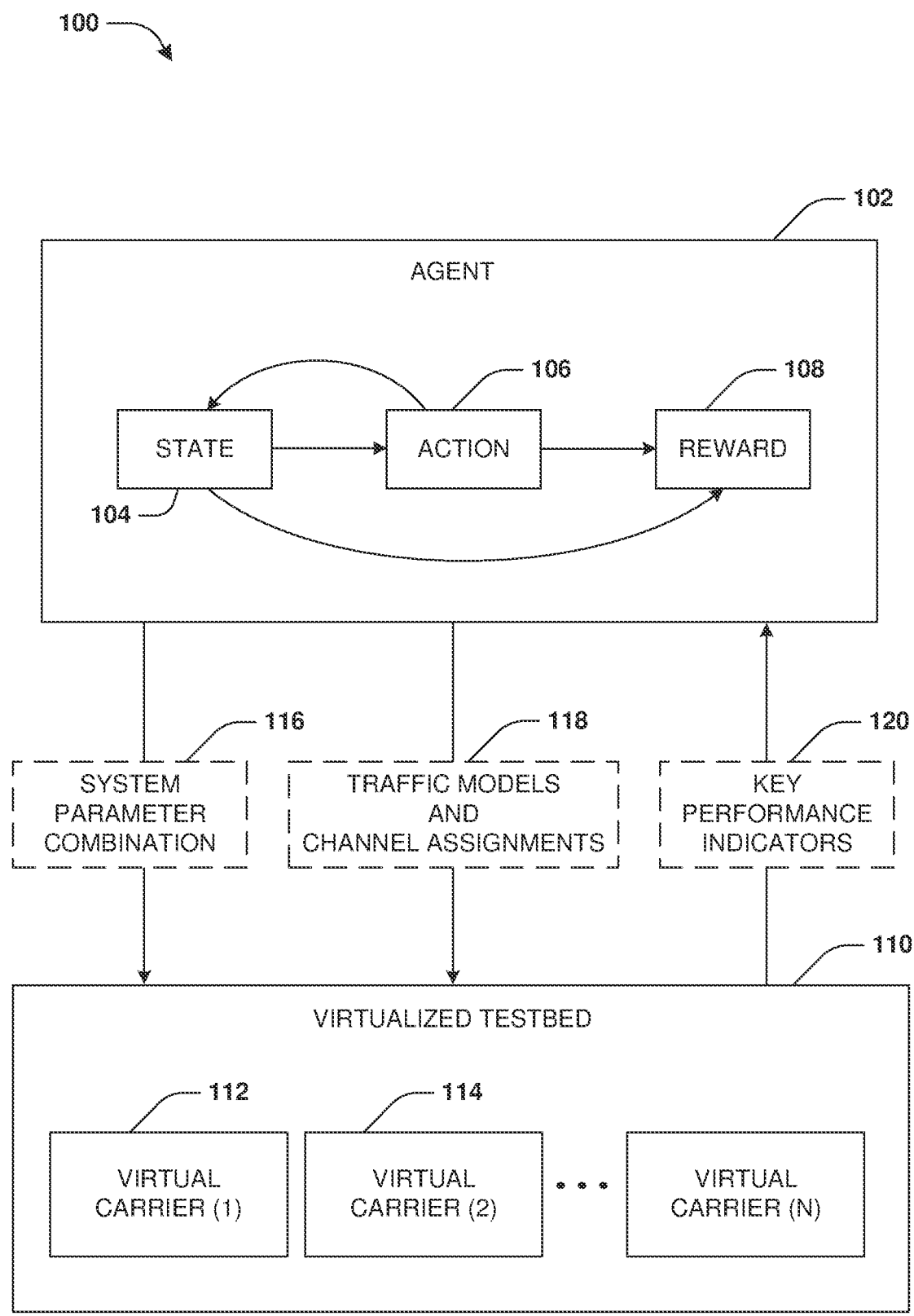
FIG. 1 is a diagram illustrating an example scenario for system parameter identification and network component configuration.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for system parameter identification and network component configuration are provided. A communication network may comprise various network components that provide communication capabilities for communication devices (e.g., phones, watches, vehicles, televisions, and/or other user equipment with communication capabilities, such as cellular or other wireless communication capabilities). These network components can be configured with system parameters that can affect how the network components operate, how the communication devices communicate over the communication network, etc.

The system parameters may relate to call flows, feature processing, and/or other types of parameters such as timers (e.g., 4G LTE timers), beamforming management properties, cell parameters, system radio parameters, etc.

In general, a technician may set values for the system parameters during install or maintenance, or the values may be preset by vendors of the network components. The use of recommended vendor values for the system parameters of network components may not result in optimal performance of the network components, the communication devices, and/or the communication network. Furthermore, the technician may merely set the values to either the recommended vendor values or may tweak merely a few system parameters based upon prior experience. At best, the technician may merely change a small subset of system parameters on a try and see basis. This is because the technician cannot test the exponentially large number of system parameter combinations (e.g., hundreds of thousands of system parameter combinations of different values could be available to try). This manual setting of values for the system parameters may not result in desired performance of the network components, the communication devices, and/or the communication network. This is because there are too many system parameter and value combinations for a human to manually test in order to identify optimal values for the system parameters. For example, a single system parameter may have hundreds to thousands of values that could be set for the system parameter (e.g., a timer could be set from 0 seconds to 86,400 seconds), and a network component may have numerous system parameters. This results in an exponentially large number of system parameter and value combinations that cannot be manually tested by humans.

Manually testing values for all possible system parameter combinations of values is expensive, time consuming, and impractical due to the large scale testing that would be necessary to test all the system parameter combinations of values. Thus, there is no way to definitively configure network components in a manner that provides desired performance of the network components, the communication devices, and/or the communication network (e.g., optimal accessibility, retainability, IP throughput, IP latency, cell availability, mobility, energy efficiency, etc.). Furthermore, some network functionality, such as radio access network (RAN) software, operates in the millisecond range. Such operation outputs too much data and scripts regarding system performance when testing system parameters, which is impractical to manually parse to determine how network components are operating when configured with the system parameters.

As provided herein, a virtualized architecture is provided for identifying system parameters, such as on a per carrier type basis, which can be used to configure network components to operate in a desired manner. The virtualized architecture implements an agent and a virtualized testbed. Communication devices (e.g., user equipment), communication traffic, baseband units, core network functionality, IP multimedia subsystem (IMS) functionality, and/or other communication network and/or network device functionality may be emulated/simulated through the virtualized testbed.

The agent is configured to generate system parameter combinations and execute network traffic scenarios through the virtualized testbed to test the system parameter combinations. The agent generates rewards for the system performance parameters based upon key performance indicators (KPIs) output by the network traffic scenarios. In this way, the agent may implement reinforcement learning through the rewards and reward policies to identify select system parameter combinations (e.g., on a per carrier type basis) that provide increased performance for the network components, the communication devices, and/or the communication network. The key performance indicators, and thus the desired performance, may relate to network accessibility, retainability, IP throughput, IP latency, cell availability, mobility, energy efficiency, etc. A select system parameter combination for a network component (e.g., a system parameter combination determined to provide more desired/optimal performance compared to other tested system parameter combinations) may be used to configure the network component. In this way, the virtualized architecture is used to identify select system parameter combinations that provide improved performance compared to other system parameter combinations. The virtualized architecture identifies the select system parameter combinations in a scalable manner in order to test a number of system parameter combinations that would otherwise be impractical for humans to manually test due to the sheer number of system parameter combinations. This architecture improves the operational efficiency, accuracy, and/or resource consumption by network components because each network component is individually tuned with determined system parameter combinations tailored for each network component. In addition, this architecture enables fine grained system parameter combination values that are targeted and personalized to each carrier instead of having the same system parameter values for all carriers (in a region or nationwide).

FIG. 1 illustrates a system 100 for implementing a virtualized architecture used to identify system parameters and configured network components. The virtualized architecture may comprise a virtualized testbed 110. The virtualized testbed 110 may be configured to emulate carriers as a first virtual carrier 112, a second virtual carrier 114, and/or other virtualized carriers. The virtualized testbed 110 may comprise virtualized (emulated) network functions of network components from various vendors. The virtualized testbed 110 may implement or emulate baseband control and switching functions of network components, such as radio technology components (e.g., 4G, 5G, etc.). The virtualized testbed 110 may implement or emulate IP transport and radio function synchronization with a network time protocol (NTP) server or other type of server. The virtualized testbed 110 may implement or emulate baseband capacity that supports multiple carriers, where a carrier is a cell within a particular frequency band (e.g., 3GPP 4G carrier can be one of the following bands: 2, 4, 5, 13, or 66). The virtualized testbed 110 may implement or emulate a baseband unit that can either be a single unit or is disaggregated to a central unit (CU) and distributed unit (DU).

The virtualized testbed 110 may emulate interfaces to emulated communication devices, such as radio units and other user equipment (UE), that are emulated using a UE emulator. The UE emulator may implement large scale software based user equipment virtualizing telecommunication technologies (e.g., 3GPP technologies) as emulated communication devices. The UE emulator may implement various different network traffic scenarios, which may correspond to a large scale number of UEs, UE category type mix, frequency band mix, mobility mix, different traffic types (e.g., high throughput, low latency, etc.), 3GPP feature mix (e.g., carrier aggregation, non-carrier aggregation, multiple input multiple output), application mix (e.g., operation of a video streaming app, a social network app, a gamming app, etc.), etc. The UE emulator may implement channel emulation enabling different radio frequency (RF) conditions per emulated communication device, such as rural, urban, pedestrian (e.g., a smart watch traveling slowly down a sidewalk), high mobility (e.g., a phone traveling along a highway at a high rate of speed), etc., along with reflecting channel impairments such as noise, interference, and distortion.

The UE emulator may implement latency simulation in order to emulate different delay and delay variation environments. The UE emulator may implement a common public radio interface connection, an enhanced common public radio interface connection, or other type of connection to a digital unit of a radio function (e.g., of a UE) in order to carry data such as IQ data corresponding to user plane information in the form of in-phase and quadrature phase modulation data (e.g., digital baseband signals). The UE emulator may implement cloudification through software defined radios (SDRs), virtual digital signal processing (DSP) (e.g., dual tone multi frequency, codecs, etc.), and hardware acceleration (e.g., GPUs, field programmable gate arrays, etc.).

The virtualized architecture is constructed with software defined radio and network virtual network functions (VNFs), and has an agent 102 configured to utilize reinforcement learning techniques to determine what system parameter values to select for configuring network components. The agent 102 is configured to construct a state 104 comprising a system parameter combination 116 corresponding to values selected for a combination of system parameters of a network component to test through a network traffic scenario (e.g., 4G LTE timers, 5G beamforming management parameters, etc.). The state 104 may also comprise traffic models (e.g., Poisson distributions of UEs in the cell) and/or channel assignments 118 (e.g., indoor or outdoor urban, etc.). A traffic model may correspond to a carrier type, a number of communication devices to emulate, and/or other traffic parameters for simulating communication of communication devices over a communication network of network components as emulated communication devices communicating over a virtualized communication network of emulated network components. A channel assignment may correspond to an inside environment, an outdoor environment, an urban environment, and/or any other type of environment.

The agent 102 may apply the state 104 to the virtual carriers of the virtualized testbed 110, such as by applying the system parameter combination 116 to the first virtual carrier 112, the second virtual carrier 114, and/or other virtual carriers. The agent 102 may perform an action 106 to execute a network traffic scenario through the virtualized testbed 110 using the traffic models and the channel assignments 118. In this way, communication of emulated communication devices over the virtualized communication network and operation of emulated network components configured according the system parameter combination 116 is simulated through the virtualized testbed 110 using the traffic models and the channel assignments 118.

During the network traffic scenario of simulating the virtualized communication network, various information that provide observability of all events in the network, may be tracked, such as accessibility, retainability, IP throughput, IP latency, cell availability, mobility, energy efficiency, etc. An example of an accessibility KPI is a Radio Resource Control (RRC) connection establishment success rate. An example of a retainability KPI is a dropped calls rate. An example of mobility KPIs are the intra or inter frequency handover success rates. An example of availability KPI is the E-UTRAN cell availability measuring the capability to provide the service to the users. This information may be tracked as key performance indicators 120. The agent 102 receives the key performance indicators 120 as feedback, and builds rewards 108 for system parameter combinations as the system parameter combinations are tested through network traffic scenarios. The agent 102 may implement reinforcement learning techniques to select a system parameter combination based upon rewards assigned to the system parameter combinations and/or based upon one or more reward policies used to weight key performance indicators in a particular manner in a reward formula used to assign rewards. This selected system parameter combination may provide more desirable performance than other system parameter combinations for a particular carrier type, such as better accessibility, retainability, IP throughput, IP latency, cell availability, mobility, energy efficiency, etc.

Figure 2:
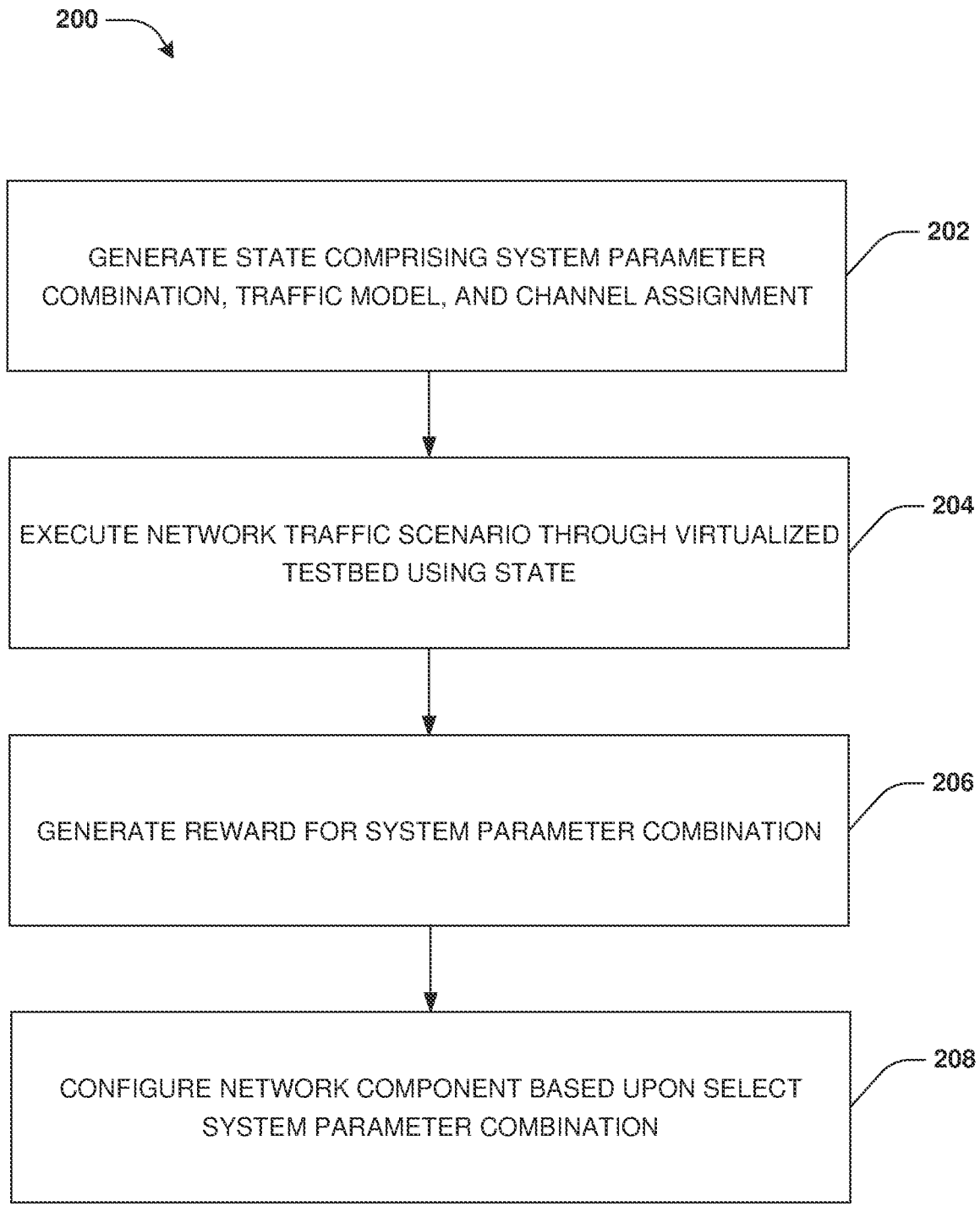
FIG. 2 is a flow chart illustrating an example method for system parameter identification and network component configuration.
Figure 3A:
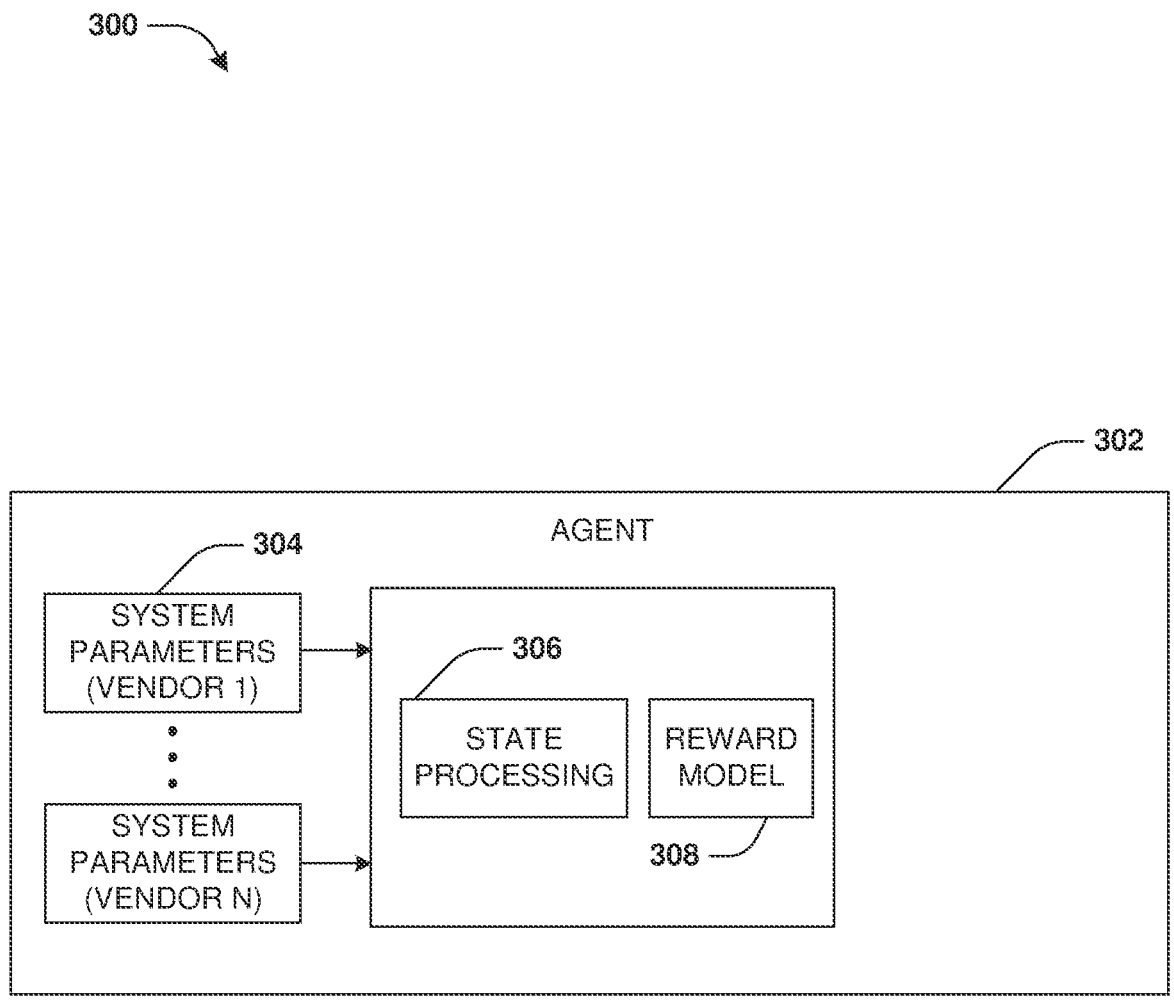
FIG. 3A is a diagram illustrating an example scenario for system parameter identification and network component configuration.

An embodiment of system parameter identification and network component configuration is illustrated by an exemplary method 200 of FIG. 2, which are further described in conjunction with system 300 of FIGS. 3A-3E. A virtualized architecture may implement an agent 302 configured to test system parameter combinations, as illustrated by FIG. 3A. The agent 302 can perform the test in a scale out manner so that any number of system parameter combinations can be tested in order to identify a select system parameter combination that can be used to configure a network component to operate in a desired manner. For example, there may be an exponentially large number of system parameter combinations (e.g., hundreds of thousands of combinations of values that can be assigned to a set of system parameters of a network component). The agent 302 is configured to generate the system parameter combinations, test the system parameter combinations, and evaluate test results in order to select a system parameter combination that results in the desired operation of the network component. An example of system parameter combination includes connectivity timers like the handover failure time and cell parameters like the nominal component of the UE transmit power for the Physical UL Control Channel (PUCCH) and/or the nominal component of the UE transmit power for the Physical UL Shared Channel (PUSCH). The desired operation may correspond to accessibility, retainability, IP throughput, IP latency, cell availability, mobility, energy efficiency, etc.

The agent 302 may receive system parameters as input. In some embodiments, the system parameters may be specified per vendor, such as where the system parameters are for a particular network component model manufactured by the vendor. For example, a first set of system parameters 304 for a first network component of a first vendor, a second set of system parameters for a second network component of a second vendor, and/or other system parameters may be received as input. The agent 302 may generate system parameter combinations based upon the system parameters. For example, the agent 302 may generate a first system parameter combination that specifies a first set of values for the first set of system parameters 304 for the first network component of the first vendor. The agent 302 may generate a second system parameter combination that specifies a second set of values for the first set of system parameters 304 for the first network component of the first vendor. At least one value of the second set of values may be different than at least one value of the first set of values. The agent 302 may generate a third systm parameter combination that specifies a third set of values for the first set of system parameters 304 for the first network component of the first vendor. At least one value of the third set of values may be different than at least one value of the first set of values and at least one value of the second set of values.

In some embodiments, a system parameter combination may correspond to system parameters of a single network component of a single vendor. In some embodiments, a system parameter combination may correspond to system parameters of multiple network components of a single vendor or multiple vendors. In some embodiments, a system parameter combination may correspond to system parameters of a single network component for a single carrier type. In some embodiments, a system parameter combination may correspond to system parameters of multiple network components for a single technology, a single carrier type, multiple carriers or multiple technologies (e.g., 4G, 5G, 6G etc.).

The agent 302 is able to scale out to generate and test a large number of system parameter combinations that humans would not be able to manually generate and test since there could be an exponentially large number of system parameter combination. In this way, the agent 302 may generate a plurality of system parameter combinations that can be tested by the agent 302 in order to identify select system parameter combinations per carrier type that provide desired operation of a communication network for the various carrier types.

Figure 3B:
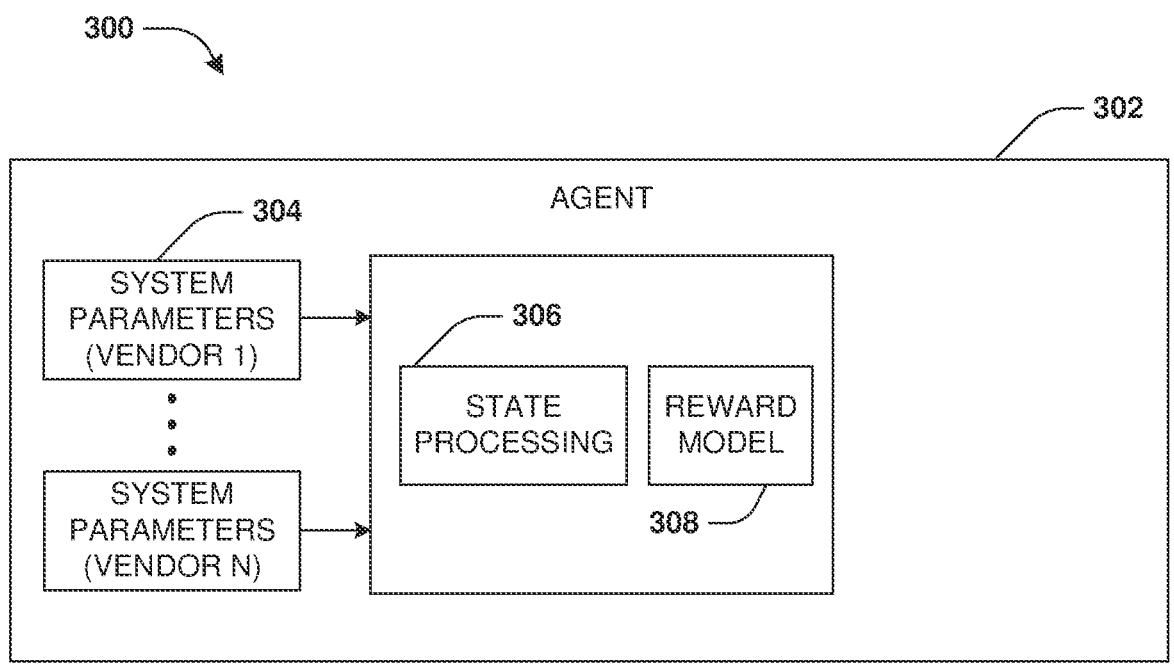
FIG. 3B is a diagram illustrating an example scenario for system parameter identification and network component configuration, where a virtualized testbed is constructed.
Figure 3B:
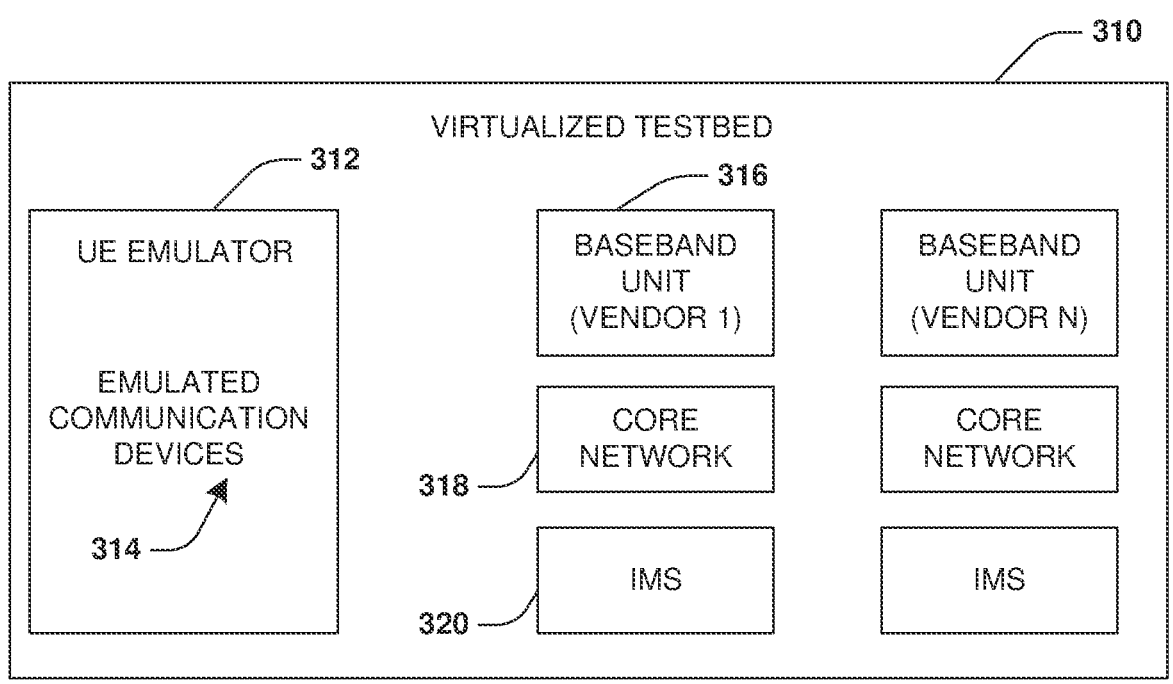

The agent 302 may initiate state processing 306 in order to initialize a virtualized testbed 310 for testing the plurality of system parameter combinations, as illustrated by FIG. 3B. In an embodiment of initiating the state processing 306, the agent 302 may initialize the carriers. In an example, a first carrier corresponds to an emulation of a first baseband unit 316 of a first vendor, an emulation of a first core network 318, and/or an emulation of a first IP multimedia core network subsystem (IMS) 320. A second carrier may correspond to an emulation of a second baseband unit of a second vendor, an emulation of a second core network, and/or an emulation of a second IMS. In this way, the agent 302 may initialize any number of carriers through the virtualized testbed 310.

As part of initializing the virtualized testbed 310, the agent 302 may initialize traffic models. A traffic model may correspond to carrier types, numbers of communication devices to emulate (e.g., a number of UEs to emulate), and/or other traffic information. An example of a traffic model includes parameters that can be used for 3GPP 4G/5G network planning and optimization such as traffic profiles made of signaling data, bandwidth, busy hour session attempts, number of simultaneous RAB (Radio Access Bearers) bearers and number of simultaneous EPS (Evolved Packet Systems) bearers. As part of initializing the virtualized testbed 310, the agent 302 may initialize channel assignments. The channel assignments may correspond to an urban environment, an indoor environment, an outdoor environment, and/or other environments where network components and/or communication devices may be communicating. As part of initializing the virtualized testbed 310, the agent 302 may specify a duration for simulating a network traffic scenario (e.g., a simulation of a month of operation, a simulation of a year of operation, etc.). In this way, the virtualized testbed 310 may be initialized and the plurality of system parameter combinations may be generated for testing through the virtualized testbed 310.

A UE emulator 312 may be initialized through the virtualized testbed 310. The UE emulator 312 may be configured to emulate any number of communication devices as emulated communication devices 314. The UE emulator 312 may implement large scale software based user equipment virtualizing telecommunication technologies (e.g., 3GPP technologies) as the emulated communication devices 314. The UE emulator 312 may implement various different network traffic scenarios, which may correspond to a large scale number of UEs, a UE category type mix, a frequency band mix, a mobility mix, different traffic types, 3GPP feature mix, an application mix, etc. The UE emulator 312 may implement channel emulation enabling different RF conditions per emulated communication device, such as rural, urban, pedestrian, high mobility, etc., along with reflecting channel impairments such as noise, interference, and distortion. The UE emulator 312 may implement latency simulation in order to emulate different delays and delay variation environments. The UE emulator 312 may implement a common public radio interface connection, an enhance common public radio interface connection, or other type of connection towards a digital unit of a radio function (e.g., the emulated communication device 314) in order to carry data such as IQ data corresponding to user plane information in the form of in-phase and quadrature phase modulation data. The UE emulator 312 may implement cloudification through software defined radios, virtual DSP, and hardware acceleration. That is, network functions and/or UE functions may be hosted in data centers (central or edge). UE emulation is implemented through cloudification. From a deployment perspective, the UE emulator 312 may also be deployed on bare metal, but at an increase cost.

Figure 3C:
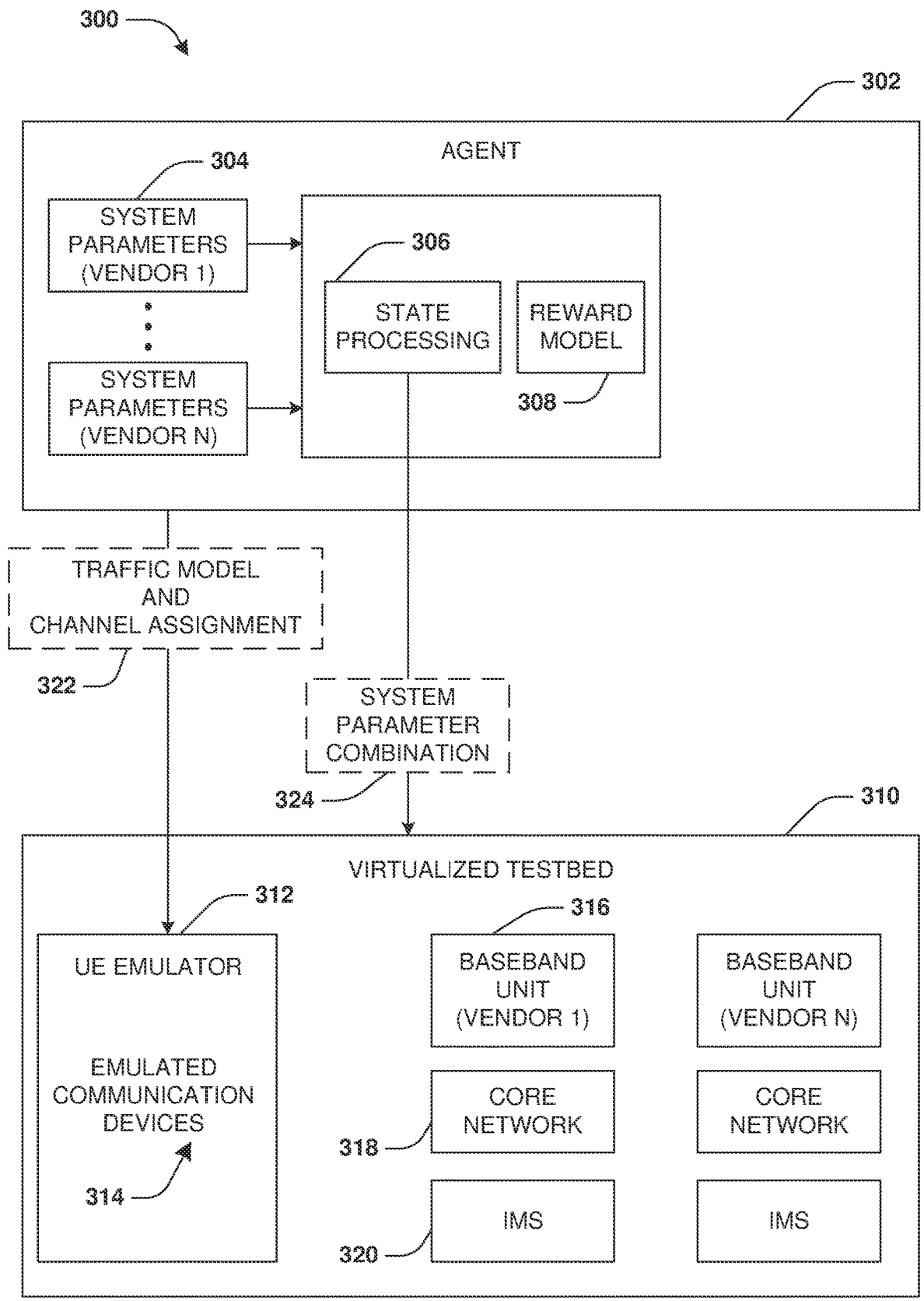
FIG. 3C is a diagram illustrating an example scenario for system parameter identification and network component configuration, where a virtualized testbed executes one or more network traffic scenarios.

During operation 202 of method 200, a state may be generated for each system parameter combination, as illustrated by FIG. 3C. The state may be generated as part of the state processing 306 implemented by the agent 302. The state may comprise a system parameter combination 324 and traffic model and channel assignments 322. In some embodiments, there may be more than one traffic model and/or channel assignment, and thus multiple states may be generated for each combination of traffic models and channel assignments in association with the system parameter combination 324.

During operation 204 of method 200, a network traffic scenario is executed through the virtualized testbed for each of the states. The network traffic scenario is executed to simulate communication of the communication network amongst the emulated communication devices 314 and emulated network components (e.g., operation of the first baseband unit 316, the first core network 318, and the first IMS 320) according the system parameter combination 324 and the traffic model and channel assignments 322 for the duration of the simulation. In some embodiments of executing the network traffic scenario, a configuration action is generated based upon baseband unit system parameters within the system parameter combination 324. The configuration action is executed by applying the baseband unit system parameters to the first baseband unit 316.

In some embodiments of executing the network traffic scenario, operation of the emulated communication devices 314 is simulated through the virtualized testbed 310, such as by the UE emulator 312. In some embodiments of executing the network traffic scenario, software defined radios, virtual digital signal processing, and/or hardware acceleration is implemented by the UE emulator 312. In some embodiments of executing the network traffic scenario, baseband control and switching functions of a radio technology component may be emulated through an emulated network component, such as the first baseband unit 316 or other emulated network component not illustrated. In some embodiments of executing the network traffic scenario, latency simulation corresponding to one or more communication delays and delay variation environments may be implemented. For example, communication delay between an emulated communication device and an emulated network component may be simulated during the network traffic scenario. In some embodiments of executing the network traffic scenario, channel emulation may be implemented to enable different radio frequency propagation conditions per emulated communication device 314. In some embodiments of executing the network traffic scenario, a common public radio interface connection, an enhanced common public radio interface connection, or any other connection may be emulated for transmission of user plane information between the emulated communication devices 314 and emulated baseband units, such as the first emulated baseband unit 316.

In some embodiments of executing the network traffic scenario, the UE emulator 312 may run traffic cases based upon the channel assignment for emulating communication network traffic under conditions of the channel assignment. In some embodiments of executing the network traffic scenario, one or more traffic scenarios may be implemented during the network traffic scenario. The one or more traffic scenarios may correspond to a number of emulated communication devices 314 that are to be operational during a traffic scenario, emulated communication device categories (e.g., types and models of the emulated communication devices 314), frequency bands for communication, mobility (e.g., communication devices traveling fast along a highway, communication devices traveling slowing or at a standstill in a residential neighborhood, etc.), traffic types (e.g., high throughput, low latency, etc.), and/or application types (e.g., operation of a social media app hosted on an emulated communication device).

Figure 3D:
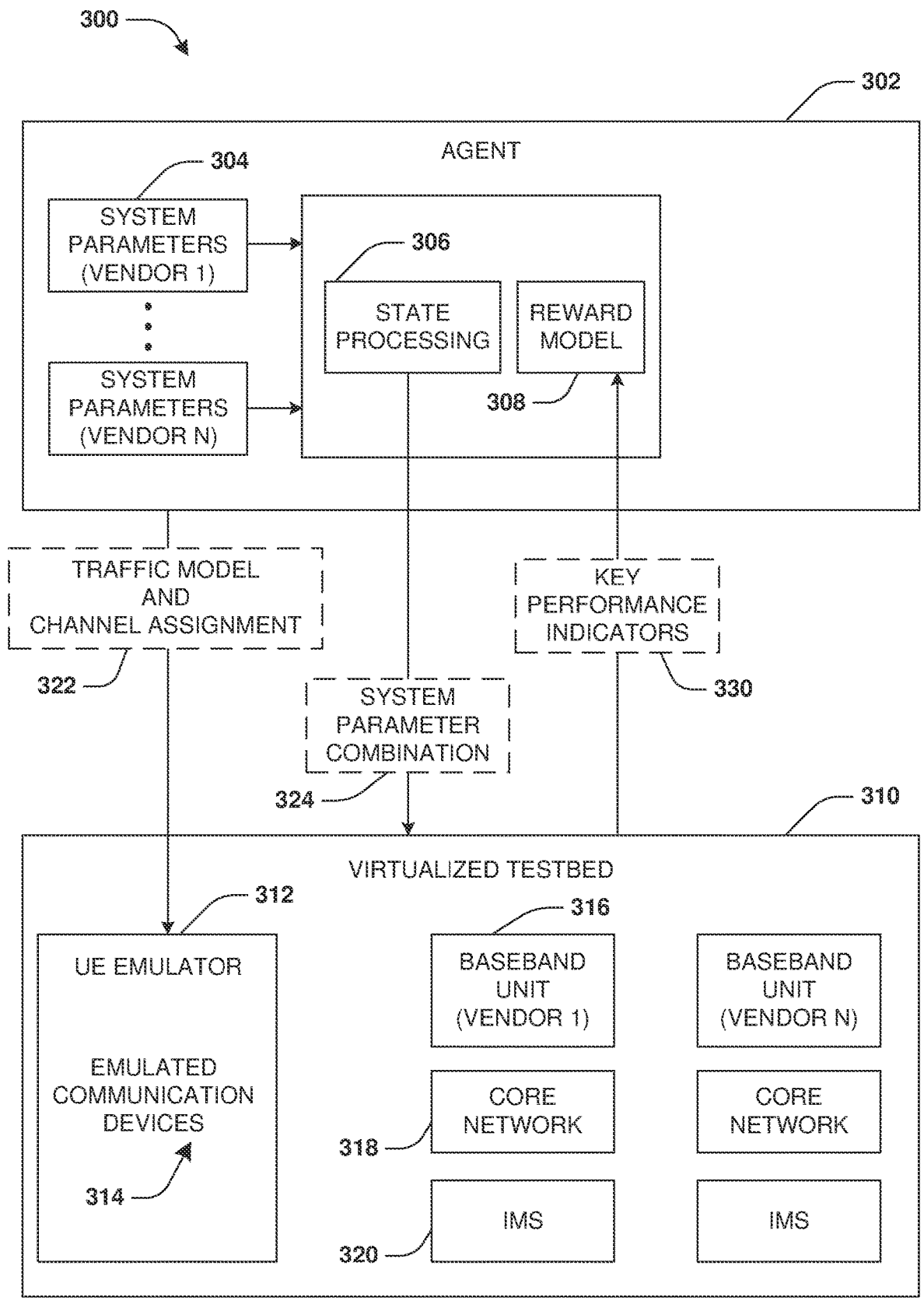
FIG. 3D is a diagram illustrating an example scenario for system parameter identification and network component configuration, where rewards are assigned based upon key performance indicators.

The agent 302 may receive key performance indicators 330 as output from one or more network traffic scenarios being executed by the virtualized testbed 310, as illustrated by FIG. 3D. The key performance indicators 330 may be the output of simulations performed to test the system parameter combinations under one or more combinations of traffic models and/or channel assignments. The key performance indicators 330 may comprise an accessibility key performance indicator, a retainability key performance indicator, an IP latency key performance indicator, an IP throughput key performance indicator, a cell availability key performance indicator, a mobility key performance indicator, an energy efficiency key performance indicator, and/or other types of performance indicators.

During operation 206 of method 200, the agent 302 may input the key performance indicators 330 into a reward model 308 for assigning rewards to each system parameter combination that was tested through the virtualized testbed 310. For example, a reward for a system parameter combination may be calculated based upon key performance indicators output during a network traffic scenario that utilized the system parameter combination. The reward may be used to update the reward model 308. In some embodiments, an experience comprising the system parameter combination, a traffic model used during the network traffic scenario, a channel assignment used during the network traffic scenario, a duration of the network traffic scenario, and/or the reward may be stored as an experience.

Figure 3E:
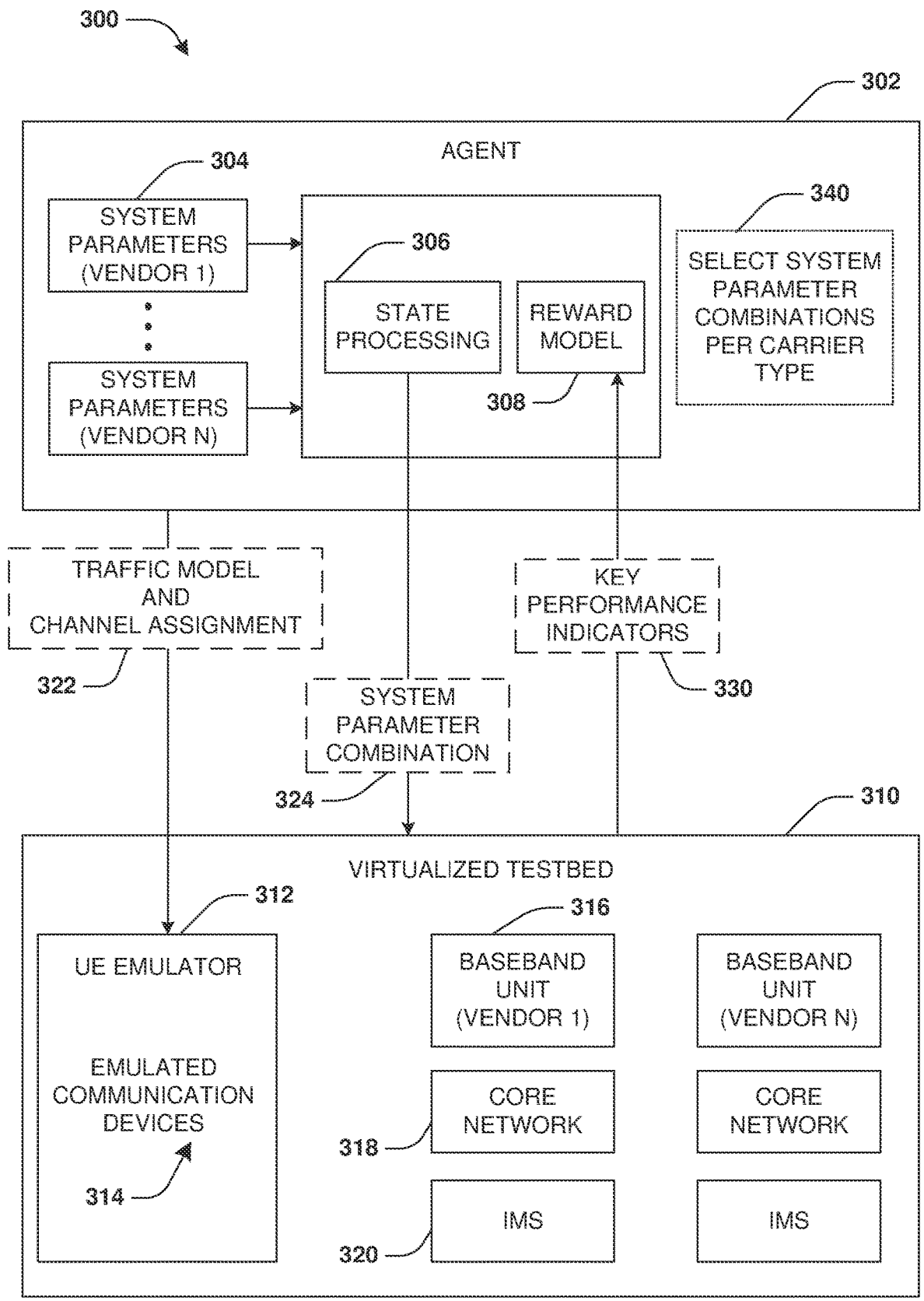
FIG. 3E is a diagram illustrating an example scenario for system parameter identification and network component configuration, where select system parameter combinations per carrier type are determined.

The experiences may be evaluated using one or more reward policies to select a system parameter combination having a reward that satisfies the one or more reward policies. For example, the select system parameter combination may provide better performance than other system parameter combinations based upon the system parameter combination having a higher reward than other system parameter combinations. In some embodiments, system parameter combinations 340 may be selected on a per carrier type basis based upon one or more reward policies, as illustrated by FIG. 3E. These system parameter combinations may be used to configure network components corresponding to the carrier types. For example, one or more reward policies may be used to select system parameter combinations for configuring network components on a per carrier type basis or traffic type. In some embodiments, a reward policy may weight each key performance indicator equally. In some embodiments, a reward policy may weight one key performance indicator different than another key performance indicator (e.g., a user may specify that certain key performance indicators are more important than other key performance indicators). In some embodiments, the one or more reward policies are part of a reward system that uses the one or more reward policies to transform KPIs into rewards, such as scores used to rank system parameter combinations.

Figure 3F:
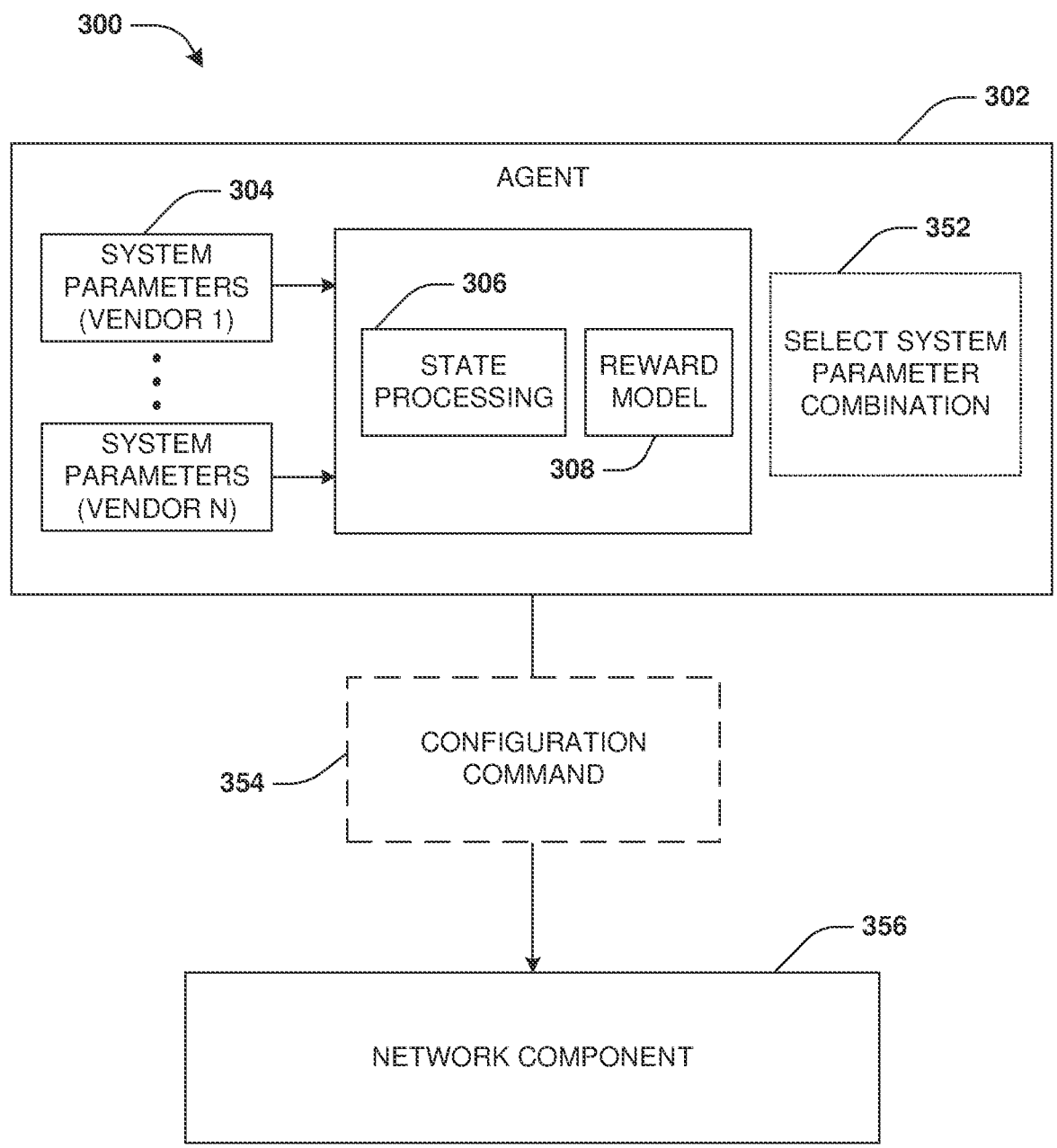
FIG. 3F is a diagram illustrating an example scenario for system parameter identification and network component configuration, where a network component is configured with a select system parameter combination.

During operation 208 of method 200, a select system parameter combination 352 is selected from the plurality of system parameter combinations, as illustrated by FIG. 3F. In some embodiments, the select system parameter combination 352 may be selected based upon the select system parameter combination 352 providing desired performance, and thus is selected for use in configuring a network component 356 (e.g., a physical network component) of a communication network.

In some embodiments, the select system parameter combination 352 comprises values for radio system parameters, cell system parameters, and/or other types of parameters. In an example, radio system parameters may correspond to a time a communication device can be active before being released, a handover failure timer, an interval between subsequent transmissions of radio resource control (RRC) connection requests, an interval between subsequent transmission RRC connection reestablishment requests, a time to wait for cell reselection or RRC connection setup after an RRC connection reject, a radio link failure (RLF) declaration timer, an RLF recovery timer, etc. Cell system parameters may correspond to a number of channel quality indicator (CQI) resources available on a physical UL control channel, a number of scheduling request resources available on a physical UL control channel, a nominal component of a communication device transmit power, etc. Other system parameters may correspond to a number of attempts for a handover to a cell better than a serving cell before the handover is attempted to a next best cell, limits on communication device transmission power in a serving cell, a number of orthogonal frequency division multiplexing (OFDM) symbols used for physical downlink control channel (PDCCH), a $1^{st}$ root sequence for random access channel (RACH) preamble generation, etc.

In some embodiments of configuring the network component 356, a configuration command 354 is transmitted over a network to the network component 356. The configuration command 354 may be executed to configure the network component 356 by setting values of system parameters to values specified by the select system parameter combination 352 in order to modify operation of the network component 356 based upon the values of the select system parameter combination 352. In this way, operation of the network component 356 may be improved so that the network component 356 operates in a desired manner, such as by improving retainability, accessibility, IP throughput, IP latency, cell availability, mobility, energy efficiency, etc. of the communication network.

According to some embodiments, a method is provided. The method includes for each system parameter combination corresponding to system parameters of network components of a communication network: generating a state comprising the system parameter combination, a traffic model, and a channel assignment; executing a network traffic scenario through a virtualized testbed using the state, wherein the virtualized testbed emulates communication over a virtualized communication network between emulated communication devices and emulated network components based upon the system parameter combination, the traffic model, and the channel assignment; and generating a reward for the system parameter combination based upon key performance indicators output by the network traffic scenario; and configuring a network component of the communication network based upon a select system parameter combination selected based upon a reward policy and rewards of the system parameter combinations.

According to some embodiments, the method includes implementing, within the network traffic scenario, latency simulation corresponding to one or more communication delays and delay variation environments.

According to some embodiments, the method includes emulating, through the network traffic scenario, at least one of a common public radio interface connection or an enhanced common public radio interface connection to transmit user plane information between the emulated communication devices and an emulated baseband unit.

According to some embodiments, the method includes implementing, within the network traffic scenario, software defined radios, virtual digital signal processing, and hardware acceleration.

According to some embodiments, the method includes implementing, within the network traffic scenario, channel emulation enabling different radio frequency conditions per emulated communication device.

According to some embodiments, the method includes implementing, within the network traffic scenario, one or more traffic scenarios corresponding to a number of emulated communication devices, emulated communication device categories, frequency bands, mobility, traffic types, and application types.

According to some embodiments, the method includes utilizing the reward policy to select system parameter combinations for configuring network components on a per carrier type basis.

According to some embodiments, the method includes utilizing the reward policy to weight each key performance indicator equally.

According to some embodiments, the method includes utilizing the reward policy to weight a first key performance indicator different than a second key performance indicator.

According to some embodiments, a system is provided. The system comprises a processor coupled to memory, the processor configured to execute instructions to perform operations. The operations include for each system parameter combination corresponding to system parameters of network components of a communication network: generating a state comprising the system parameter combination, a traffic model, and a channel assignment; executing a network traffic scenario through a virtualized testbed using the state, wherein the virtualized testbed emulates communication over a virtualized communication network between emulated communication devices and emulated network components based upon the system parameter combination, the traffic model, and the channel assignment; and generating a reward for the system parameter combination based upon key performance indicators output by the network traffic scenario; and transmitting a configuration command over a network to a network component of the communication network, wherein the configuration command is executed to configure the network component based upon a select system parameter combination selected based upon a reward policy and rewards of the system parameter combinations.

According to some embodiments, the operations include initializing the network traffic scenario with a scenario duration, the traffic model specifying carrier types and a number of communication devices to emulate, the channel assignment corresponding to an environment to emulate, and carriers corresponding to the carrier types.

According to some embodiments, the operations include generating a configuration action based upon baseband unit system parameters within the system parameter combination; and executing the configuration action by applying the baseband unit system parameters to an emulated baseband unit.

According to some embodiments, the operations include running, by a user equipment emulator, a traffic case based upon the channel assignment.

According to some embodiments, the operations include store an experience comprising the system parameter combination, the traffic model, the channel assignment, a duration of the network traffic scenario, and the reward.

According to some embodiments, a non-transitory computer-readable medium storing instructions that when executed facilitate performance of operations, is provided. The operations include for each system parameter combination corresponding to system parameters of network components of a communication network: generating a state comprising the system parameter combination, a traffic model, and a channel assignment; executing a network traffic scenario through a virtualized testbed using the state, wherein the virtualized testbed emulates communication over a virtualized communication network between emulated communication devices and emulated network components based upon the system parameter combination, the traffic model, and the channel assignment; and generating a reward for the system parameter combination based upon key performance indicators output by the network traffic scenario; and modifying parameter values of a network component within the communication network to modify operation of the network component based upon a select system parameter combination selected based upon a reward policy and rewards of the system parameter combinations.

According to some embodiments, the operations include emulating baseband control and switching functions of a radio technology component through an emulated network component.

According to some embodiments, the operations include generating the reward based upon an accessibility key performance indicator and a retainability key performance indicator.

According to some embodiments, the operations include generating the reward based upon an IP latency key performance indicator and an IP throughput key performance indicator.

According to some embodiments, the operations include generating the reward based upon a cell availability key performance indicator and a mobility key performance indicator.

According to some embodiments, the operations include generating the reward based upon an energy efficiency key performance indicator.

Figure 4:
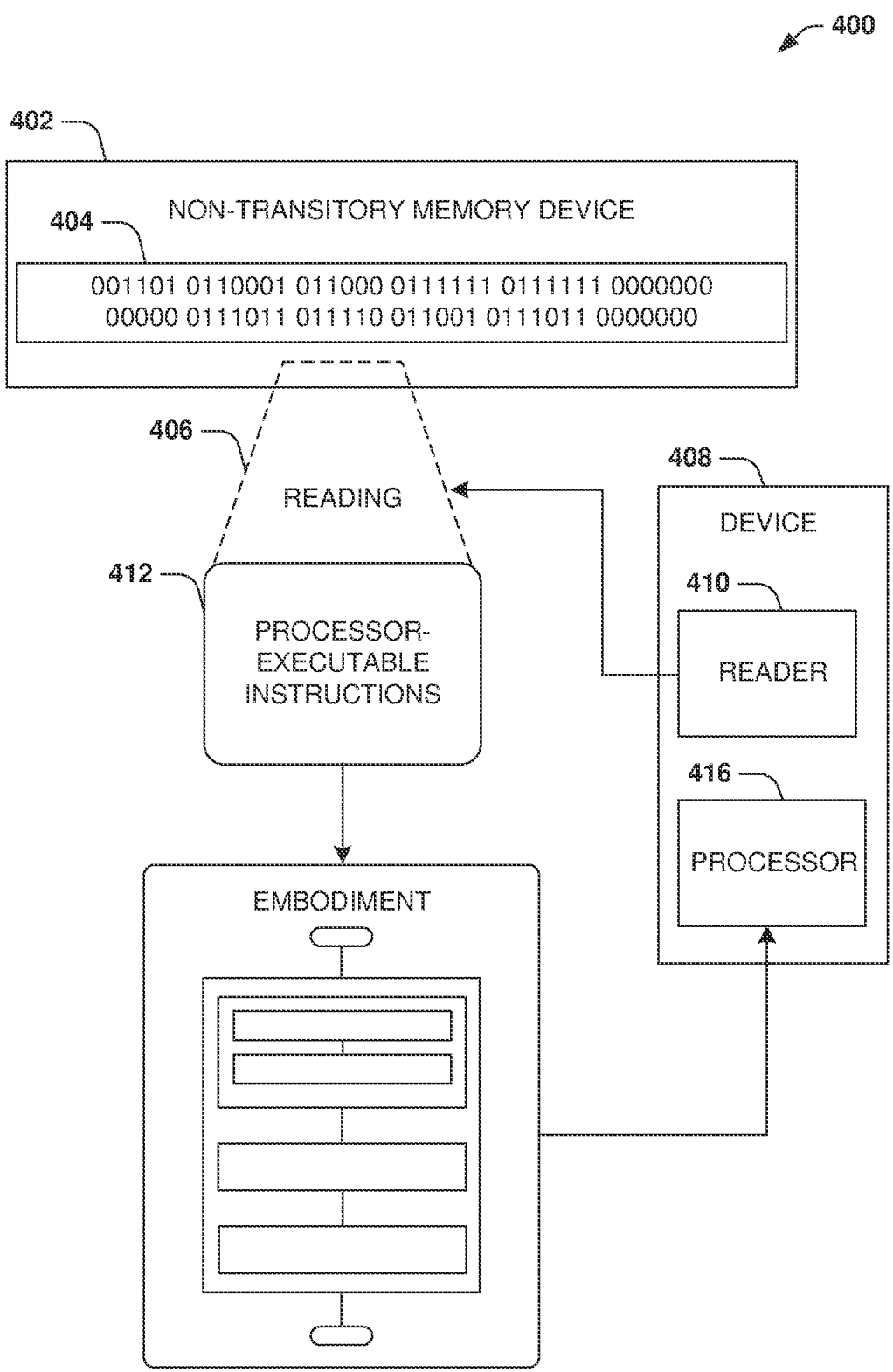
FIG. 4 is an illustration of a scenario featuring an example non-transitory machine readable medium in accordance with one or more of the provisions set forth herein.

FIG. 4 is an illustration of a scenario 400 involving an example non-transitory machine readable medium 402. The non-transitory machine readable medium 402 may comprise processor-executable instructions 412 that when executed by a processor 416 cause performance (e.g., by the processor 416) of at least some of the provisions herein. The non-transitory machine readable medium 402 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 402 stores computer-readable data 404 that, when subjected to reading 406 by a reader 410 of a device 408 (e.g., a read head of a hard disk drive, or a read operation invoked on a solid-state storage device), express the processor-executable instructions 412. In some embodiments, the processor-executable instructions 412, when executed cause performance of operations, such as at least some of the example method 200 of FIG. 2, for example. In some embodiments, the processor-executable instructions 412 are configured to cause implementation of a system, such as at least some of the example system 100 of FIG. 1 and/or at least some of the example system 300 of FIGS. 3A-3E, for example.

Figure 5:
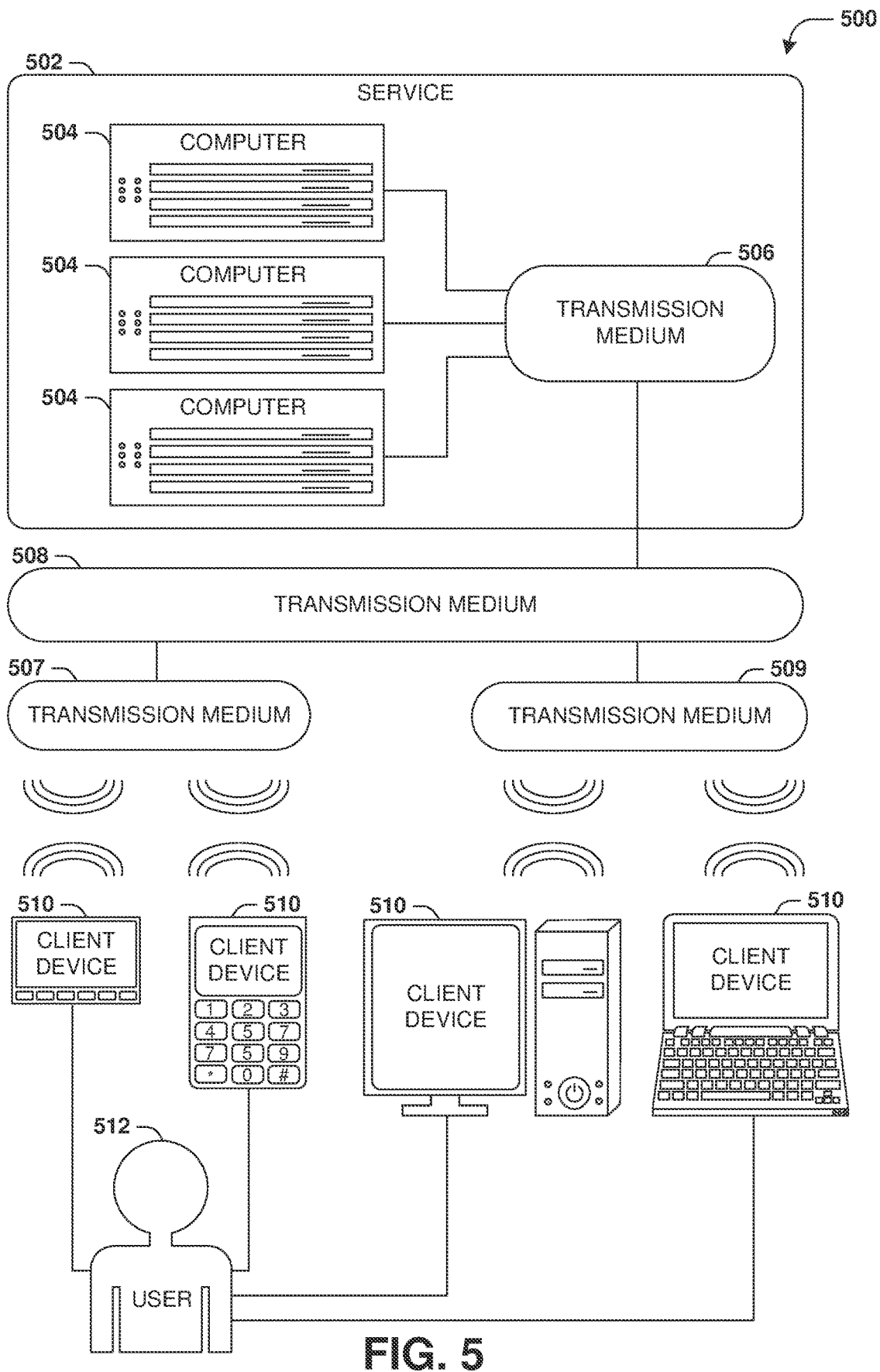
FIG. 5 is an illustration of example networks that may utilize and/or implement at least a portion of the techniques presented herein.

FIG. 5 is an interaction diagram of a scenario 500 illustrating a service 502 provided by a set of computers 504 to a set of client devices 510 via various types of transmission mediums. The computers 504 and/or client devices 510 may be capable of transmitting, receiving, processing, and/or storing many types of signals, such as in memory as physical memory states.

The computers 504 of the service 502 may be communicatively coupled together, such as for exchange of communications using a transmission medium 506. The transmission medium 506 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 502.

Likewise, the transmission medium 506 may comprise one or more sub-networks, such as may employ different architectures, may be compliant or compatible with differing protocols and/or may interoperate within the transmission medium 506. Additionally, various types of transmission medium 506 may be interconnected (e.g., a router may provide a link between otherwise separate and independent transmission medium 506).

In scenario 500 of FIG. 5, the transmission medium 506 of the service 502 is connected to a transmission medium 508 that allows the service 502 to exchange data with other services 502 and/or client devices 510. The transmission medium 508 may encompass various combinations of devices with varying levels of distribution and exposure, such as a public wide-area network and/or a private network (e.g., a virtual private network (VPN) of a distributed enterprise).

In the scenario 500 of FIG. 5, the service 502 may be accessed via the transmission medium 508 by a user 512 of one or more client devices 510, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 510 may communicate with the service 502 via various communicative couplings to the transmission medium 508. As a first such example, one or more client devices 510 may comprise a cellular communicator and may communicate with the service 502 by connecting to the transmission medium 508 via a transmission medium 507 provided by a cellular provider. As a second such example, one or more client devices 510 may communicate with the service 502 by connecting to the transmission medium 508 via a transmission medium 509 provided by a location such as the user's home or workplace (e.g., a WiFi (Institute of Electrical and Electronics Engineers ( IEEE) Standard 502.11) network or a Bluetooth (IEEE Standard 502.15.1) personal area network). In this manner, the computers 504 and the client devices 510 may communicate over various types of transmission mediums.

Figure 6:
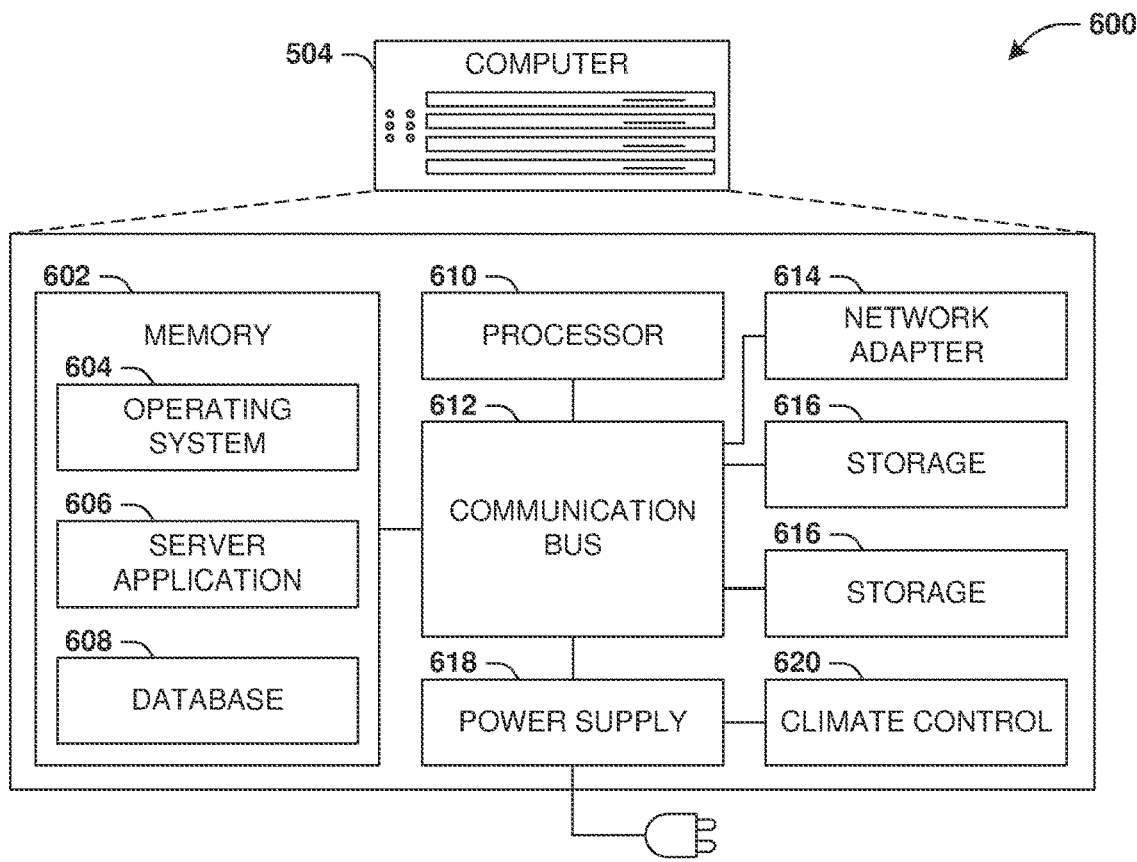
FIG. 6 is an illustration of a scenario involving an example configuration of a computer that may utilize and/or implement at least a portion of the techniques presented herein.

FIG. 6 presents a schematic architecture diagram 600 of a computer 504 that may utilize at least a portion of the techniques provided herein. Such a computer 504 may vary widely in configuration or capabilities, alone or in conjunction with other computers, in order to provide a service such as the service 502.

The computer 504 may comprise one or more processors 610 that process instructions. The one or more processors 610 may optionally include a plurality of cores; one or more coprocessors, such as a mathematics coprocessor or an integrated graphical processing unit (GPU); and/or one or more layers of local cache memory. The computer 504 may comprise memory 602 storing various forms of applications, such as an operating system 604; one or more computer applications 606; and/or various forms of data, such as a database 608 or a file system. The computer 504 may comprise a variety of peripheral components, such as a wired and/or wireless network adapter 614 connectible to a local area network and/or wide area network; one or more storage components 616, such as a hard disk drive, a solid-state storage device (SSD), a flash memory device, and/or a magnetic and/or optical disk reader.

The computer 504 may comprise a mainboard featuring one or more communication buses 612 that interconnect the processor 610, the memory 602, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 612 may interconnect the computer 504 with at least one other computer. Other components that may optionally be included with the computer 504 (though not shown in the schematic architecture diagram 600 of FIG. 6) include a display; a display adapter, such as a graphical processing unit (GPU); input peripherals, such as a keyboard and/or mouse; and a flash memory device that may store a basic input/output system (BIOS) routine that facilitates booting the computer 504 to a state of readiness.

The computer 504 may operate in various physical enclosures, such as a desktop or tower, and/or may be integrated with a display as an "all-in-one" device. The computer 504 may be mounted horizontally and/or in a cabinet or rack, and/or may simply comprise an interconnected set of components. The computer 504 may comprise a dedicated and/or shared power supply 618 that supplies and/or regulates power for the other components. The computer 504 may provide power to and/or receive power from another computer and/or other devices. The computer 504 may comprise a shared and/or dedicated climate control unit 620 that regulates climate properties, such as temperature, humidity, and/or airflow. Many such computers 504 may be configured and/or adapted to utilize at least a portion of the techniques presented herein.

Figure 7:
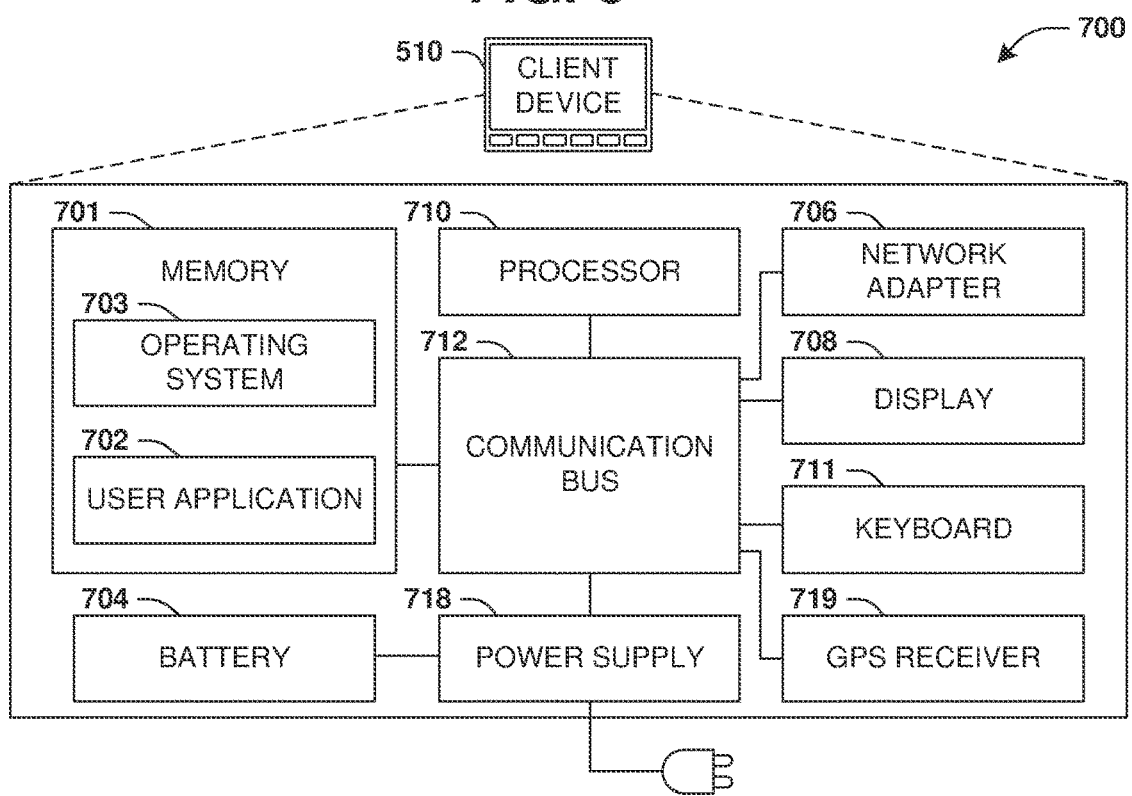
FIG. 7 is an illustration of a scenario involving an example configuration of a client that may utilize and/or implement at least a portion of the techniques presented herein.

FIG. 7 presents a schematic architecture diagram 700 of a client device 510 whereupon at least a portion of the techniques presented herein may be implemented. Such a client device 510 may vary widely in configuration or capabilities, in order to provide a variety of functionality to a user such as the user 512. The client device 510 may be provided in a variety of form factors, such as a desktop or tower workstation; an "all-in-one" device integrated with a display 708; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 510 may serve the user in a variety of roles, such as a workstation, kiosk, media player, gaming device, and/or appliance.

The client device 510 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The client device 510 may comprise memory 701 storing various forms of applications, such as an operating system 703; one or more user applications 702, such as document applications, media applications, file and/or data access applications, communication applications such as web browsers and/or email clients, utilities, and/or games; and/or drivers for various peripherals. The client device 510 may comprise a variety of peripheral components, such as a wired and/or wireless network adapter 706 connectible to a local area network and/or wide area network; one or more output components, such as a display 708 coupled with a display adapter (optionally including a graphical processing unit (GPU)), a sound adapter coupled with a speaker, and/or a printer; input devices for receiving input from the user, such as a keyboard 711, a mouse, a microphone, a camera, and/or a touch-sensitive component of the display 708; and/or environmental sensors, such as a global positioning system (GPS) receiver 719 that detects the location, velocity, and/or acceleration of the client device 510, a compass, accelerometer, and/or gyroscope that detects a physical orientation of the client device 510. Other components that may optionally be included with the client device 510 (though not shown in the schematic architecture diagram 700 of FIG. 7) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 510 to a state of readiness; and a climate control unit that regulates climate properties, such as temperature, humidity, and airflow.

The client device 510 may comprise a mainboard featuring one or more communication buses 712 that interconnect the processor 710, the memory 701, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 510 may comprise a dedicated and/or shared power supply 718 that supplies and/or regulates power for other components, and/or a battery 704 that stores power for use while the client device 510 is not connected to a power source via the power supply 718. The client device 510 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In some embodiments, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    for each system parameter combination corresponding to system parameters of network components of a communication network:
        generating a state comprising the system parameter combination, a traffic model, and a channel assignment;
        executing a network traffic scenario through a virtualized testbed using the state, wherein the virtualized testbed emulates communication over a virtualized communication network between emulated communication devices and emulated network components based upon the system parameter combination, the traffic model, and the channel assignment; and
        generating a reward for the system parameter combination based upon key performance indicators output by the network traffic scenario; and
    configuring a network component of the communication network based upon a select system parameter combination selected based upon a reward policy and rewards of the system parameter combinations.

2. The method of claim 1, wherein executing the network traffic scenario comprises:
    implementing, within the network traffic scenario, latency simulation corresponding to at least one of one or more communication delays, one or more delay variation environments, or packet loss simulation.

3. The method of claim 1, wherein executing the network traffic scenario comprises:
    emulating, through the network traffic scenario, at least one of a common public radio interface connection or an enhanced common public radio interface connection to transmit user plane information between the emulated communication devices and an emulated baseband unit.

4. The method of claim 1, wherein executing the network traffic scenario comprises:
    implementing, within the network traffic scenario, software defined radios, virtual digital signal processing, and hardware acceleration.

5. The method of claim 1, wherein executing the network traffic scenario comprises:
    implementing, within the network traffic scenario, channel emulation enabling different radio frequency conditions per emulated communication device.

6. The method of claim 1, wherein executing the network traffic scenario comprises:
    implementing, within the network traffic scenario, one or more traffic scenarios corresponding to a number of emulated communication devices, emulated communication device categories, frequency bands, mobility, traffic types, and application types.

7. The method of claim 1, comprising:
    utilizing the reward policy to select system parameter combinations for configuring network components on a per carrier type basis.

8. The method of claim 1, comprising:
    utilizing the reward policy to weight each key performance indicator equally.

9. The method of claim 1, comprising:
    utilizing the reward policy to weight a first key performance indicator different than a second key performance indicator.

10. A system comprising:
    a memory comprising instructions; and
    a processor coupled to the memory, the processor configured to execute the instructions to facilitate performance of operations comprising:
        for each system parameter combination corresponding to system parameters of network components of a communication network:
            generating a state comprising the system parameter combination, a traffic model, and a channel assignment;
            executing a network traffic scenario through a virtualized testbed using the state, wherein the virtualized testbed emulates communication over a virtualized communication network between emulated communication devices and emulated network components based upon the system parameter combination, the traffic model, and the channel assignment; and
            generating a reward for the system parameter combination based upon key performance indicators output by the network traffic scenario; and
        transmitting a configuration command over a network to a network component of the communication network, wherein the configuration command is executed to configure the network component based upon a select system parameter combination selected based upon a reward policy and rewards of the system parameter combinations.

11. The system of claim 10, wherein the operations comprise:
    initializing the network traffic scenario with a scenario duration, the traffic model specifying carrier types and a number of communication devices to emulate, the channel assignment corresponding to an environment to emulate, and carriers corresponding to the carrier types.

12. The system of claim 10, wherein the operations comprise:
    generating a configuration action based upon baseband unit system parameters within the system parameter combination; and executing the configuration action by applying the baseband unit system parameters to an emulated baseband unit.

13. The system of claim 10, wherein the operations comprise:
    running, by a user equipment emulator, a traffic case based upon the channel assignment.

14. The system of claim 10, wherein the operations comprise:
   store an experience comprising the system parameter combination, the traffic model, the channel assignment, a duration of the network traffic scenario, and the reward.

15. A non-transitory computer-readable medium storing instructions that when executed facilitate performance of operations comprising:
   for each system parameter combination corresponding to system parameters of network components of a communication network:
      generating a state comprising the system parameter combination, a traffic model, and a channel assignment;
      executing a network traffic scenario through a virtualized testbed using the state, wherein the virtualized testbed emulates communication over a virtualized communication network between emulated communication devices and emulated network components based upon the system parameter combination, the traffic model, and the channel assignment; and
      generating a reward for the system parameter combination based upon key performance indicators output by the network traffic scenario; and
   modifying parameter values of a network component within the communication network to modify operation of the network component based upon a select system parameter combination selected based upon a reward policy and rewards of the system parameter combinations.

16. The non-transitory computer-readable medium of claim 15, wherein the operations comprise:
   emulating baseband control and switching functions of a radio technology component through an emulated network component.

17. The non-transitory computer-readable medium of claim 15, wherein the operations comprise:
   generating the reward based upon an accessibility key performance indicator and a retainability key performance indicator.

18. The non-transitory computer-readable medium of claim 15, wherein the operations comprise:
   generating the reward based upon an IP latency key performance indicator and an IP throughput key performance indicator.

19. The non-transitory computer-readable medium of claim 15, wherein the operations comprise:
   generating the reward based upon a cell availability key performance indicator and a mobility key performance indicator.

20. The non-transitory computer-readable medium of claim 15, wherein the operations comprise:
   generating the reward based upon an energy efficiency key performance indicator.

* * * * *